Dec. 18, 1923.  
B. F. SEYMOUR  
WHEEL  
Filed March 22, 1921  
1,477,915
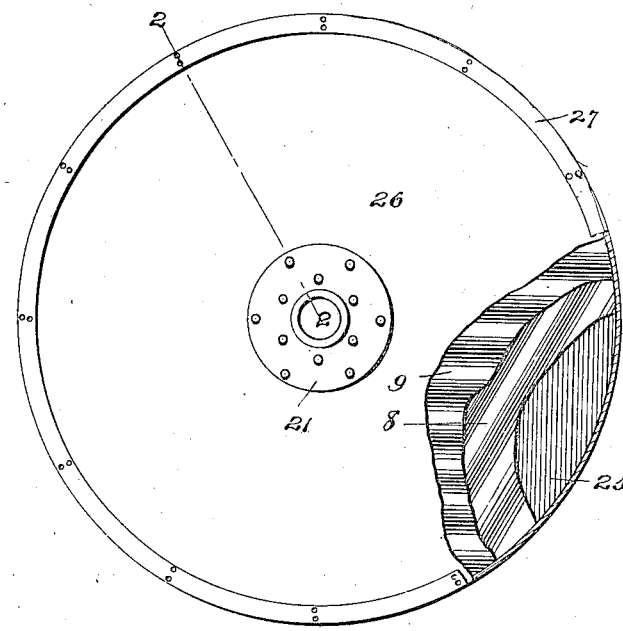
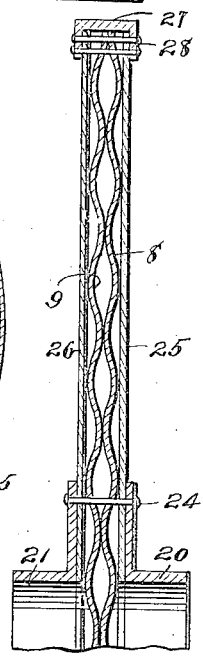

Patented Dec. 18, 1923.

1,477,915

UNITED STATES PATENT OFFICE.

BENJAMIN F. SEYMOUR, OF INDIANAPOLIS, INDIANA.

WHEEL.

Original application filed July 20, 1918, Serial No. 245,857. Divided and this application filed March 22, 1921. Serial No. 454,349.

*To all whom it may concern:*

Be it known that I, BENJAMIN F. SEYMOUR, a citizen of the United States, residing at Indianapolis, in the county of Marion and State of Indiana, have invented certain new and useful Improvements in Wheels, of which the following is a specification.

The present invention relates to corrugated metal structures and consists in the combinations and arrangements of elements hereinafter described and particularly set forth in the accompanying claims.

The purpose of the invention is to provide a structure of a corrugated metal plate with one or more flat plates of like material, or of two or more corrugated metal sheets arranged and secured in a manner adapted to give maximum strength with the minimum of material and lightness of structure.

It is also contemplated to build the wheel of two or more corrugated plates and two or more flat plates all suitably secured together into a unitary and rigid structure. The principle is particularly adapted to the construction of light-weight vehicle wheels, and especially truck wheels, by reason of its ability to withstand heavy and rough usage.

The disclosure shown herein forms a division of my co-pending application for U. S. patent bearing Serial No. 245,857, filed July 20, 1918.

The invention is shown by way of illustration in the accompanying drawings, wherein:—

Figure 1 is a side elevational view of the wheel, partly broken away for clearness; and Figure 2 is a central sectional view thereof on the line 2—2, Figure 1, taken on an enlarged scale.

Referring to the construction in further detail, the wheel is formed of a pair of circular or disk-like plates 8 and 9 of suitably corrugated metal, and disposed face to face or in contact. Said discs or plates have their corrugations disposed in preferably the angular relation shown, as it is believed this arrangement gives a more sturdy and durable structure than with the corrugations at right angles to each other. It will be understood, of course, that the angular relation between the plates may be selected at will. The intersecting corrugated plates are secured together preferably by spot welding at a plurality of intersecting points, though any other securing means may be employed.

A pair of flat metal discs or plates 25 and 26 are secured to the corrugated sheets by spot welding at different points of contact, and in addition thereto fastening bolts 24 pass through the flange portions of the hub members 20 and 21 as shown. The rim member 27 forms an angular trough that receives the peripheral portions of the corrugated plates 8 and 9, and the side plates 25 and 26, and is secured thereto by a suitable number of equally spaced pairs of bolts or pins 28, as shown.

It will therefore be seen that with this arrangement a wheel is provided which will derive the maximum strength efficiency from the material used and one which will be neat and compact in appearance and will readily suggest itself as an appropriate type of wheel for automobiles and especially those of the motor truck type.

It will be understood, of course, that the wheel may be made of a single corrugated plate and a flat plate or plates, or two more corrugated plates may be united with two or more flat plates, and it may also be desirable to interpose a flat plate or plates between the corrugated plates.

It is obvious that those skilled in the art may vary the details of construction and arrangement of parts without departing from the spirit of my invention, and, therefore, I do not wish to be limited to such features except as may be required by the claims.

Having thus described the invention, what is claimed is:

1. A wheel structure comprising a corrugated disc and a non-corrugated disc secured thereto, substantially as set forth.

2. A wheel structure comprising a corrugated disc and non-corrugated discs secured thereto, substantially as set forth.

3. A wheel structure comprising corrugated discs and non-corrugated discs secured thereto, substantially as set forth.

4. A wheel structure comprising a disc having parallel corrugations, and non-corrugated discs secured thereto, substantially as set forth.

5. A wheel structure comprising a disc having parallel corrugations, and a flat disc secured thereto, substantially as set forth.

6. A wheel structure comprising discs having parallel corrugations, and non-corrugated discs secured thereto, substantially as set forth.

7. A wheel structure comprising a pair of discs having corrugations, and a pair of non-corrugated discs secured thereto and located externally and on either side thereof, substantially as set forth.

8. A wheel structure comprising a pair of discs having parallel corrugations, and a pair of flat discs located externally of and secured on either side thereof, substantially as set forth.

In testimony whereof I affix my signature.

BENJAMIN F. SEYMOUR.